United States Patent [19]

Schaub et al.

[11] Patent Number: 5,407,465
[45] Date of Patent: Apr. 18, 1995

[54] TUNING OF VACUUM PRESSURE SWING ADSORPTION SYSTEMS

[75] Inventors: Herbert R. Schaub, East Amherst; James Smolarek, Boston; Frederick W. Leavitt, Amherst; Lee J. Toussaint, Lockport, all of N.Y.; Kimberly A. LaSala, Lexington, Ky.

[73] Assignee: Praxair Technology, Inc., Danbury, Conn.

[21] Appl. No.: 168,562

[22] Filed: Dec. 16, 1993

[51] Int. Cl.⁶ .......................................... B01D 53/047
[52] U.S. Cl. ...................................... 95/14; 95/101; 95/102; 95/105; 95/130
[58] Field of Search .............. 95/14, 15, 19, 22, 23, 95/101–105, 130; 96/112

[56] References Cited

U.S. PATENT DOCUMENTS

| | | | |
|---|---|---|---|
| 4,197,095 | 4/1980 | White, Jr. et al. | 95/15 |
| 4,315,759 | 2/1982 | Benkmann | 95/23 |
| 4,496,376 | 1/1985 | Hradek | 96/112 |
| 4,539,019 | 9/1985 | Koch | 95/130 X |
| 4,589,436 | 5/1986 | Schebler et al. | 137/115 |
| 4,643,743 | 2/1987 | Gradar | 55/26 |
| 4,693,730 | 9/1987 | Miller et al. | 55/18 |
| 4,725,293 | 2/1988 | Gunderson | 55/162 |
| 4,756,723 | 7/1988 | Sircar | 95/103 |
| 4,816,043 | 3/1989 | Harrison | 96/112 |
| 4,832,711 | 5/1989 | Christel, Jr. et al. | 95/14 |
| 4,941,894 | 7/1990 | Black | 95/14 |
| 4,995,889 | 2/1991 | Abel et al. | 55/21 |
| 5,037,458 | 8/1991 | Trepaud | 96/112 X |
| 5,199,964 | 4/1993 | Gräff | 95/14 |
| 5,258,056 | 11/1993 | Shirley et al. | 95/22 |
| 5,296,017 | 3/1994 | Kono et al. | 95/14 |

FOREIGN PATENT DOCUMENTS

| | | | |
|---|---|---|---|
| 0504521 | 9/1992 | European Pat. Off. | 96/112 |
| 63-080823 | 4/1988 | Japan | 95/14 |
| 0590003 | 1/1978 | U.S.S.R. | 95/14 |
| 0929179 | 5/1982 | U.S.S.R. | 95/14 |
| 1510897 | 9/1989 | U.S.S.R. | 95/14 |

*Primary Examiner*—Robert Spitzer
*Attorney, Agent, or Firm*—Alvin H. Fritschler

[57] ABSTRACT

Vacuum and other pressure swing adsorption vessels are monitored, and corrective adjustments are made in the pressure equalization and/or repressurization steps in response to imbalances in the temperature profiles of the vessels in order to tune the system. The PSA process is also desirably purge tuned to avoid over purging or under purging of each vessel.

20 Claims, 1 Drawing Sheet

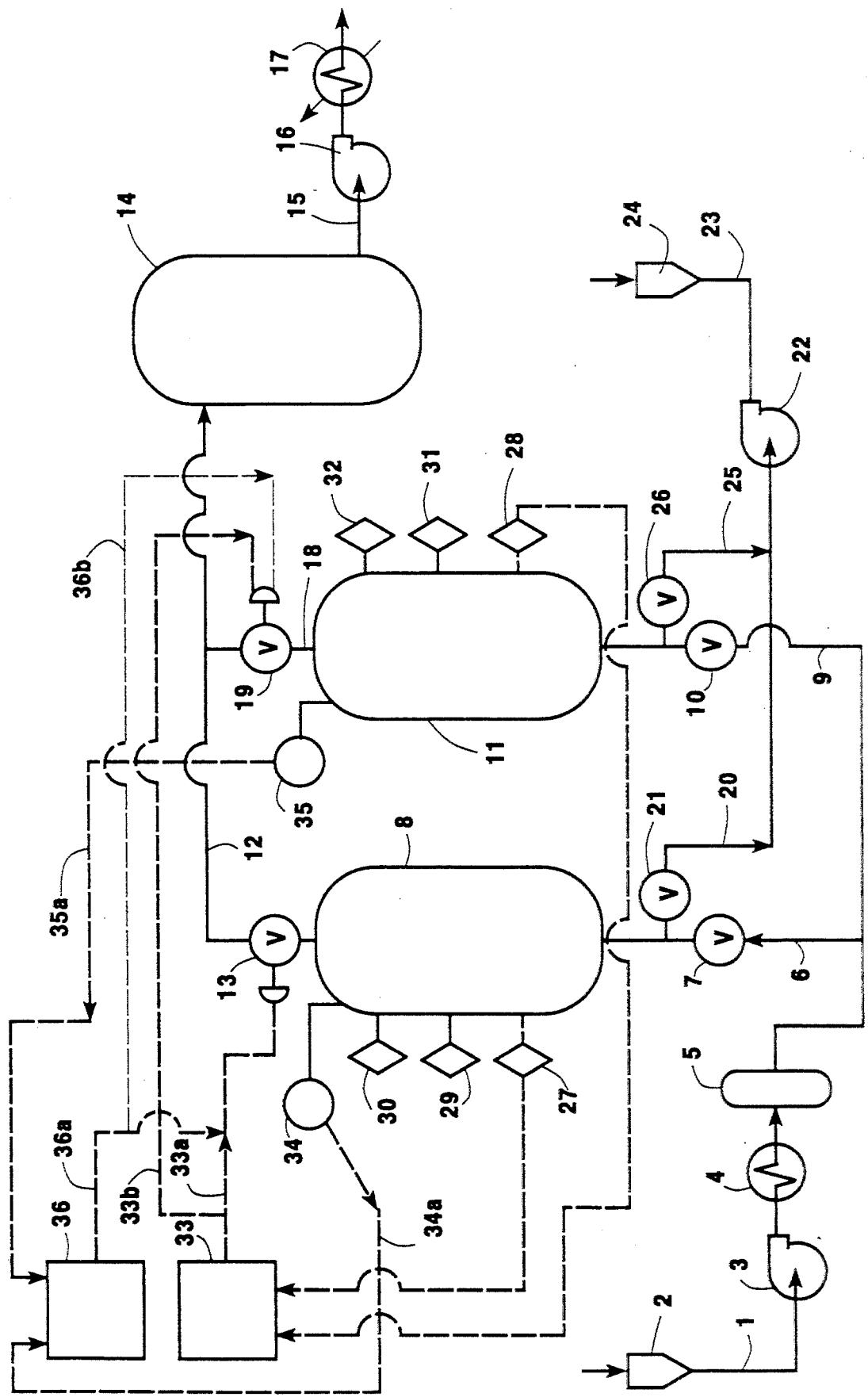

TUNING OF VACUUM PRESSURE SWING ADSORPTION SYSTEMS

BACKGROUND OF THE INVENTION

1. Field of the Invention

The invention relates to pressure swing adsorption for gas separation. More particularly, it relates to the tuning of vacuum pressure swing adsorption systems to maintain stable high performance.

2. Description of the Prior Art

Pressure swing adsorption (PSA) processes have been used to separate and purify gases in highly significant applications, such as the separation of air to produce oxygen or nitrogen product gas. Most PSA processes are carried out in multi-bed systems with each bed undergoing the same sequence of steps but in a different phase relationship with other beds in the system. Such processes involve adsorption at an upper pressure level, desorption at a lower pressure level, and repressurization from the lower pressure to the upper pressure. Many PSA processes also employ one or more pressure equalization steps or repressurization steps in which gas is withdrawn from one bed at high pressure and passed, directly or through the use of a surge tank, to another bed initially at lower pressure until the pressures in said beds are equalized. This enables some compression energy to be saved, and generally also enhances the overall recovery of product gas, e.g., oxygen, in the process, In vacuum pressure swing adsorption (VPSA) processes, the lower desorption pressure is a sub-atmospheric, i.e., vacuum, desorption pressure. In a desirable VPSA processing sequence for air separation, the following sequence of operating steps is carried out, on a cyclic basis, in one or more adsorbent beds capable of selectively adsorbing a more adsorbable component of a feed gas mixture from the less adsorbable component thereof; (1) feed gas pressurization of each adsorbent bed from an intermediate pressure to the upper, super-atmospheric adsorption pressure; (2) feed gas introduction to the feed end of the bed at said upper adsorption pressure, with adsorption of the more adsorbable component and simultaneous withdrawal of the less adsorbable component from the product end of the bed; (3) countercurrent depressurization to a lower pressure, with release of gas from the feed end of the bed; (4) evacuation to a lower sub-atmospheric, i.e., vacuum, desorption pressure; (5) optional purge, typically by the introduction of a small amount of product gas to the product end of the bed at the lower desorption pressure; and (6) repressurization of the bed to the intermediate pressure level. This VPSA processing sequence can be used in a single bed system or in multi-bed systems containing two or more adsorbent beds. In variations of such processing, a co-current depressurization step or steps can be employed in which gas is released from the product end of the bed, as for pressure equalization to an intermediate pressure with another bed in the system.

The PSA process, including the VPSA process, is a transient process that is influenced by external disturbances and variables. In some cases, once a disturbance is introduced to the system, it does not automatically self-correct itself in response to such changes. Instead, the problem may grow, and self perpetuate until the PSA process can no longer operate at peak capacity or efficiency. Variables that can affect the PSA process include outside ambient temperature, inlet feed conditions, process equipment variability, process valve positioning and response time, and a variety of other factors. In order for the PSA process to run optimally, it must be monitored in order to determine if an outside variable has had an impact on the process. Once this has been determined, steps can be taken to correct and compensate the system in order to force it to run in its optimal condition once again. One variable in a PSA process that has been found to have a great impact on the performance of the system is adsorbent vessel temperature profiles. Typically, in a VPSA process, especially with advanced high capacity adsorbents, the temperature profile in the axial direction follows these trends:

Bottom Adsorbent Vessel Temperature (Inlet Feed Gas End):

30° to 60° F. below the Feed Gas Temperature

Middle Adsorbent Vessel Temperature (at a Point Halfway between the Inlet Feed Gas End and the Product Outlet End of the Vessel):

10° to 30° F. below the Feed Gas Temperature.

Top Adsorbent Vessel Temperature (Product End of the Vessel):

Within ±10° F. of the Feed Gas Temperature.

In a PSA process, if the adsorbent vessel temperature profile follows the above trends, then the process is assumed to be running in a stable "tuned" condition. However, a small disturbance in the process can very easily skew the vessel temperature profiles, causing them to be very different from the criteria indicated above. From experience, it can be seen that when the adsorbent vessels have very different temperature profiles from those normally observed in the art, then product recovery will decrease, unit power consumption will increase, and overall plant performance will be lower. This problem becomes even more critical as newer and better performing adsorbent materials are used in PSA, including VPSA, systems.

In order for a VPSA system to perform optimally, it has heretofore been necessary to manually adjust the pressure equalization or repressurization and purge flows for each adsorbent vessel in the system to assure that each adsorbent bed was achieving the production of similar product purities. This has typically been done by connecting an oxygen analyzer to a point downstream of the product withdrawal point to the beds and measuring the breakthrough purities of the product gas. Once the breakthrough purities were balanced, the process was said to be "tuned", and maximum product gas capacity would be produced at the lowest unit power consumption.

In the Abel et al. U.S. Pat. No. 4,995,089, the control of product flow from an adsorption separation system when the downstream customer has a discontinuous use pattern is addressed. A differential pressure controller is used to measure the differential pressure (DP) in a product pipeline. On the basis of the DP value measured in the line, the differential pressure controller sends an appropriate pneumatic signal to a valve in the pipeline in order to control product flow. This automatic control approach is related solely to the control of pipeline product flow to a customer, and is not directed to the actual PSA process operation, or to optimizations that can make the process more efficient.

In another PSA control approach, Schebler et al., U.S. Pat. No. 4,589,436, disclose the use of a small bleed valve in conjunction with an oxygen partial pressure monitor in order to control the partial pressure of oxygen in the product stream. If said partial pressure were to rise above a certain preset limit, the bleed valve could open, thus allowing a small portion of product gas to escape into the atmosphere. This causes the PSA plant to produce more gas, which, in turn, lowers the oxygen purity in the product stream, thus lowering the oxygen partial pressure in this stream. While this patent discusses the control of oxygen partial pressures by increasing product gas flow, it does not relate to the lowering of product flow in an efficient manner, so as to avoid an increase in unit power consumption, and does not relate to PSA vessel temperature, or the use thereof to control product purity from a specific PSA vessel in response to the process disturbances referred to above.

Another automatic control for a PSA system is disclosed in the Gunderson patent, U.S. Pat. No. 4,725,293. In order to control impurity levels in the product stream, the inlet feed flows are changed in response to the purity levels in the product stream. However, the compression machinery desirably used to provide a feed stream to the PSA system are constant displacement machines, and the actual volumetric inlet feed gas, e.g., air, is relatively constant, with cycle times being altered in order to change the total amount of feed gas used in a PSA process. In the practice of the approach recited in the patent, a reduction in the feed gas, with other processing variables kept constant, will result in a corresponding reduction in product flow. In addition, the patent makes no mention of the monitoring of adsorbent bed vessel temperatures in order to control product purity in the course of PSA processing operations.

The use of PSA systems to supply oxygen under variable demand conditions is disclosed in the Grader patent, U.S. Pat. No. 4,643,743. At maximum design capacity of the PSA process, the oxygen product/feed air ratio is a set value. As oxygen demand level from a customer falls from design flow conditions, the oxygen product feed air ratio is increased pursuant to the patented process. The overall product purity level decreases, but the actual oxygen content level in the product stream passing to a wastewater treatment operation is maintained at the desired flow level. Thus, the feed air flow is decreased, or the product flow rate is increased, thereby reducing the overall oxygen purity, but supplying the correct oxygen flow to the customer under reduced demand conditions. In the practice of other PSA applications, it is desired to maintain the oxygen purity at a constant level. The patent provides no teaching with respect to bed temperature monitoring in order to produce constant purity from each adsorbent bed in a PSA processing operation.

The Miller et al. patent, U.S. Pat. No. 4,693,730, discloses a method for controlling the purity of a gas component in a PSA product stream. Co-current depressurization, i.e., pressure equalization, gas is analyzed to determine whether a product purity problem exists. Once this is determined, then action can be taken to restore the purity level of the product stream to its correct level. The patent suggests three approaches to correct a purity problem existing in the process. Thus, the adsorption step time can be adjusted in order to control impurity loading in each adsorbent vessel of a PSA system; the final depressurization step pressure can be adjusted to avoid impurity breakthrough; or the amount of purge gas entering each adsorbent vessel can be adjusted during the purge step. Such actions are taken in response to the monitoring of the pressure equalization gas purity level. The patent does not suggest bed temperature monitoring, nor efficiencies in power consumption in turning down product flow from a PSA system when a customer does not draw maximum design flow rates from the process.

The method of tuning a PSA system by the Miller et al. approach requires sampling of the oxygen approach breakthrough purities of the adsorbent beds in the system. This requires the use of an additional oxygen analyzer and an onsite adjustment of the process controls in order to "tune" the PSA system and balance the product flow and purities between the adsorbent beds. This procedure requires several iterations over a relatively long period of time, typically about 12–24 hours.

There is a need in the art for an improved method of tuning PSA systems, including VPSA systems. While controlling and changing aspects of the product stream in order to optimize product purity in the VPSA system has thus been suggested, the approach of tuning adsorbent vessels, in order to improve process performance, has not been disclosed in the art. The advantage of an approach directed to the tuning of adsorbent vessels would be that such an approach would attempt to compensate for any process inefficiencies before they are able to negatively impact PSA plant performance. In the cases of the prior art approaches, the monitoring of the product stream is to determine whether there is a process problem that needs to be corrected. At this point in time, product flow and/or purity has already been affected, and must be remedied. The solving of potential process problems before they occur is inherently a more advantageous way in which to control the PSA, e.g. VPSA process.

It is an object of the invention to provide a process for tuning PSA, including VPSA, systems for maintaining stable, high performance operation.

It is another object of the invention to provide a VPSA vessel tuning process based on monitoring adsorbent vessel temperature profiles during the course of VPSA operations.

It is a further object of the invention to provide a VPSA tuning process automatically compensating for the adverse effects of processing disturbances and enabling optimum operating conditions to be maintained.

With these and other objects in mind, the invention is hereafter described in detail, the novel features thereof being particularly pointed out in the appended claims.

SUMMARY OF THE INVENTION

VPSA and other PSA adsorbent vessels are monitored and automatically tuned in response to skewed bed temperature profiles. In the event that the monitoring of vessel temperatures determines that an oxygen or other product purity imbalance exists between each bed in a VPSA system, corrective adjustments are promptly made so as to obviate process problems before they occur rather than after they exist and require correction.

BRIEF DESCRIPTION OF THE DRAWING

The invention is hereinafter described in detail with reference to the accompanying single figure drawing of a schematic flow diagram of a two adsorbent bed embodiment of the practice of the invention.

DETAILED DESCRIPTION OF THE INVENTION

The objects of the invention are accomplished by using the adsorbent vessel temperatures to determine whether a gas purity imbalance occurs as a result of outside processing disturbances and variables. On the basis of the temperature profiles determined by the monitoring of adsorbent vessel temperatures, adjustments are made in pressure equalization amounts or oxygen repressurization amounts or purge flow amounts and/or make product (i.e. oxygen) amounts, pertaining to each of the vessels in order to balance the temperature profiles in each bed. It should be noted that the adjustments serve to adjust the net amount of gas coming from the bed, when the net amount of gas is the amount of product gas produced during the make product step and the amount of gas removal during the cocurrent depressurization step minus the reflex amount to the bed. Herein, the reflex amount is defined as the amount of pressure equalization flow, oxygen or other product gas repressurization flow and purge flow to the bed. Process inefficiencies are thereby compensated for before they negatively impact on VPSA plant performance. As a result, tuned performance and optimal flow rates are achieved at any particular product purity level, with the lowest power consumption for the process.

In the practice of the invention, VPSA feed-end bed temperatures and pressure indicators are utilized to adjust pressure equalization, oxygen repressurization and purge flow amounts, respectively, through advanced tuning of the VPSA system. By thus adjusting cycle operation, stable, high performance of the VPSA system can be maintained so as to overcome the loss of performance experienced with a fixed cycle processing sequence due to the influence of outside variations as described above.

In the VPSA process, maximum flow rates are reached for a given product purity when each of the adsorbent vessels is producing equal purity product streams. If there are different purities produced from each adsorbent vessel, then lower than maximum flow rates will exist. In the case of a two bed process, product flow from one adsorbent vessel indirectly affects product flow from the other. If both vessels are producing identical product purities and a disturbance occurs which causes one adsorbent vessel to produce lower product purity than that in the pipeline, then the other vessel will automatically produce higher purity than the average purity in the pipeline, because each vessel's flow affects the flow in the other. When the first vessel starts to produce lower purity product gas, the other bed is forced to produce higher purity product gas in order to maintain the required product pipeline purity. In order for the second vessel to produce high purity product gas, the product purity front that normally moves through the adsorbent vessel is not extended through to the end of the bed, because at the edge of this purity front lays impure gas components, and so high purity product gas cannot be produced. Instead, the purity front is left within the adsorbent vessel, which, in turn, leaves an abundance of the desired gas component in the vessel to be evacuated during the evacuation step. The product gas that comes from this vessel is of higher purity, but the flow rate out of the vessel is much lower in order to produce this purity level. The consequence of this phenomenon is a decrease in the total pipeline flow rate at the same product purity as before the disturbance. The reason that such low purity product gas is being produced from the other vessel also has to do with purity fronts within the vessel. In this case, the vessel is actually being overdrawn, and a significant volume of contaminants being drawn out of it, along with a majority of the desired product component in the gas stream. It would be expected that these two effects would cancel each other out with no loss in total product flow rate at the same pipeline product purity. In reality, a very little impure gas is needed to contaminate the product stream from a vessel, and, in order to draw high purity gas from the opposite adsorbent bed to balance the overall average pipeline purity, a very small quantity of contaminants can exist in the product stream of this vessel. The only way that this will happen is to stop production from this vessel before the purity front rises to the product end of the vessel. Consequently, the amount of product that is ultimately drawn from this vessel is much lower than the increased flow drawn from the low purity vessel. This phenomenon has been observed in VPSA plants, and many times, once this problem is started, it will worsen, and the plants may begin to produce less and less amounts of product gas for a given product purity, without being able to self-correct itself. This process has been observed in VPSA plants, and it was discovered that certain trends in adsorbent vessel temperature profiles accompanied this phenomenon.

Whenever the adsorbent vessels became "unbalanced" in the manner described above, the vessel that produces low purity product develops a reduced temperature gradient from the bottom, i.e., feed end, to the top, i.e., product end, of the adsorbent bed. In this condition, colder than normal temperature exists at the top of the bed, with warmer temperatures than normal at the bottom portion of the adsorbent vessel. The temperature gradient from the bottom of the vessel to the top will thus be 10° to 20° instead of from 30° to 60° for normal operation. In contrast, the vessel that produces high purity product develops an increased temperature gradient, with colder bottom temperatures and higher top temperatures.

For example, bottom temperatures may be 10° F. or more lower than normal, with average temperatures in the middle portion of the bed, and very high top temperatures 10° F. or more higher than as indicated in the typical VPSA temperature profiles indicated above. These changes in adsorbent vessel temperature gradients are proportional to the ratio of product purity and its recovery. It can be attributed to the relative flow rates exiting the adsorbent vessels. In the case of the high purity vessel, a much lower flow rate of product gas is being withdrawn. Since gas is not being efficiently withdrawn from the vessel, the local temperature gradients will have a tendency to increase. At the top of the vessel, the temperature is higher because there is less heat pumping when the top is filled with oxygen and little nitrogen. Since there is a lower flow than normal through this bed, heat will not be able to exit at a normal rate, but will instead accumulate at the top of the vessel, thereby causing the greater temperature gradient that occurs in the high purity vessel of an unbalanced VPSA vessel. On the other hand, in the low purity product vessel, the cause for the lower purity product exiting this bed is due to overdrawing of the gas stream of this vessel. When this occurs, a larger flow rate of gas is exiting the bed in each processing cycle, and this larger flow rate tends to lower the temperature profile. Heat that is generated from the VPSA process is carried out of the adsorbent vessel, and the result is a vessel with a very small, or reduced, range in temperature from the bottom of the vessel to the top thereof. In order to balance the temperature profiles in each of the adsorbent vessels, the relative flows exiting from the product end of each adsorbent vessel must also be balanced.

In the practice of the invention, the relative flows exiting the product end of each adsorbent vessel are balanced in order to produce maximum product flow levels from the overall VPSA operation. When an imbalance in the process occurs as determined immediately by a variation in the desired bed temperature profile, which would cause each VPSA vessel to consequently start producing different purity levels of product at different flow rates, there needs to be an adjustment in the flow rates of the vessels in order to correct such imbalance. One way to do this would be to change the relative amounts of product flow from each vessel. However, this would require additional control and flow measurement equipment. Instead, the relative amounts of pressure equalization or oxygen repressurization gas entering each vessel can be altered, along with the purge flow rates, if a purge step is employed, in order to balance the total amount of product flow exiting each vessel. In the case of the high purity vessel, during the imbalanced condition, a lower flow of product is being drawn from this bed, causing the temperature profile of this vessel to become stretched. By increasing the amount of gas exiting this vessel, and entering the other vessel, a larger amount of total flow is drawn so as to lower the temperature profile from this vessel. For the lower purity vessel, too much total flow is being withdrawn from this vessel. By decreasing the amount of product gas being withdrawn from this vessel, the temperature profile in this vessel thereby increases to a more normal state, while the temperature profile in the high purity vessel will contract back to a more normal state.

In the practice of the invention a suitable process computer/controller employs flow control logic that preferably utilizes the average bottom temperatures to adjust the pressure equalization or product repressurization flows. This is because the bottom temperatures are the quickest to respond to any disturbances, and any change that may have occurred in the process will show up at this point before any other temperature point in the vessel. Similarly, however, other bed temperature positions could be utilized to control the VPSA processing operation. Through practice, however, it has been determined that the bottom bed temperature positions are the most effective because of their faster response time. Differences in bed temperatures between the vessels are used to calculate a new pressure equalization or product gas, e.g., oxygen, repressurization setting for the control valves at the product end of each of the adsorbent vessels, based on whether more or less gas is needed to be drawn from the vessel using the following correlation. The control logic equation that is conveniently used to calculate the required amount of valve adjustment is based on the difference in average bottom bed temperatures for the hour of operating time preceding the adjustment time. This temperature difference is multiplied by a Gain Value that produces valve position change in the process control system. A Reset Value is also used to improve stability by correcting the valve adjustment amount by a temperature difference rate of change between adjustment time periods. Gain Value and Reset Value are numerical constants determined through VPSA plant testing to achieve stable operation. Their values will vary with valve sizes, ambient conditions, adsorbent material, and VPSA system characteristics. Valve adjustment periods are also determined for specific VPSA systems through VPSA plant testing to achieve stable generation.

Valve adjustment required (%) = Gain Value × (Bed A Bottom Temp. − Bed B Bottom Temp.) + Reset × ((Temp. Diff./Last Hour) − (Temp. Diff./Prev. Time Period))

Actual values of valve adjustment for Bed "A" for columns 2, 3 and 4 of Table 1 is calculated as follows:

Valve adjustment for
Bed "A":  = (0.1)(57−62) + (0.1){(57−62)−(60−60)}
Column 2: = −0.5−0.5 = −1.0
Column 3:  = (0.1)(58−61)+(0.1){58−61)−(57−62)}
= −0.3+0.2 = −0.1
Column 4:  = (0.1)(59−60)+(0.1){(59−60)−(58−61)}
= −0.1+0.2 = +0.1

It should be noted that the frequency of valve change cannot be too great. Otherwise, the process would not have time to alter the bottom bed temperatures resulting from changes made in valve position, and the process will end up oscillating. From testing experience, it has been found that adjustments can be made every few hours to maintain "tuned" operation.

For illustrative purposes, a 2-bed VPSA process is depicted in the drawing, with reference to a 2-bed VPSA oxygen system. Feed air in line 1, containing suction filter 2, is passed to feed blower 3, aftercooler 4 and water separator 5 prior to passage in line 6, containing valve 7, to the feed or bottom end of bed 8, or in line 9, containing valve 10, to the feed or bottom end of bed 11. Line 12 containing control valve 13 passes from the upper or product end of bed 8 to oxygen receiver 14, from which product oxygen is passed to line 15, containing oxygen compressor 16 and heat exchanger 17, for recovery as desired oxygen product of the VPSA system. Line 18, containing control valve 19, extends from the top or product end of bed 11 to said line 12.

Discharge line 20, containing valve 21, passes from line 6, between valve 7 and the bottom of bed 8, to vacuum pump 22, from which non-product gas is passed in line 23 to collection vessel 24 or for discharge from the system. Similarly, discharge line 25, containing valve 26, extends from line 9, between valve 10 and the bottom of bed 11, to said discharge line 20.

Adsorbent bed temperature sensor 27 is desirably positioned at the lower portion of bed 8, and adsorbent bed temperature sensor 28 is desirably positioned at the lower end of bed 11 for the bed tuning purposes of the invention. It will be noted that temperature sensors 29 and 30 are shown in the middle and upper portions, respectively, of bed 8, and temperature sensors 31 and 32 are likewise shown positioned in the middle and upper portions, respectively, of bed 11. Temperature sensors 27 and 28 are adapted to send temperature input signals from beds 8 and 11, respectively, to process computer/controller 33, which is adapted to transmit output control signals 33a and 33b to control valve 13 and control valve 19 at the upper ends of beds 8 and 11, respectively. It will be appreciated that said temperature input signals could be transmitted from temperature sensors 29 and 31 in the middle portions of beds 8 and 11, or from temperature sensors 30 and 32 in the upper portions of said beds 8 and 11, in place of or in addition to the preferred use of temperature control sensors 27 and 28 in the bottom portion of said beds 8 and 11.

Adsorbent bed pressure sensor 34 is positioned in the upper portion of bed 8 and adsorbent bed pressure sensor 35 is positioned in the upper portion of bed 11. Both sensors are adapted to transmit pressure input signals to process computer/controller 36, which is adapted to transmit output control signals 36a and 36b to said control valve 13 and control valve 19 at the upper end of beds 8 and 11 respectively.

In the practice of the invention in the illustrated 2-bed VPSA system for the production of oxygen from air, each bed undergoes a processing sequence that includes adsorption at upper adsorption pressure, with the passage of feed air to the bed and the recovery of oxygen therefrom; cocurrent depressurization with a release of gas from the product end of the bed, the pressure of the bed being reduced from the upper adsorption pressure to an intermediate pressure, said gas being passed to the product end of the other bed initially at lower pressure for pressure equalization between the beds at the intermediate pressure level; countercurrent depressurization, with release of gas from the feed end of the bed to reduce the pressure to a lower, subatmospheric (vacuum) desorption pressure; optional purge at lower desorption pressure; partial repressurization from the lower desorption pressure to intermediate pressure, with the passage of gas to the product end thereof from the other bed for pressure equalization purposes; and repressurization from intermediate pressure to upper adsorption pressure by the passage of feed air to the feed end of the bed. Adsorbent bed temperature sensors, e.g. sensor 27 in bed 8 and sensor 28 in bed 11, are used to monitor the temperature profiles in the beds. When an imbalance occurs, process controller 33 sends output signals 33a and 33b so as to adjust control valves 13 and 19 to alter the flow of gas to and from the beds during pressure equalization. Thus, a lower flow of gas is drawn from the low purity vessel and passed to the other vessel during the cocurrent depressurization-pressure equalization step so as to stretch the temperature profile of said bed to a more normal range at which the purity is desirably increased. A higher amount of gas is drawn from the high purity vessel during its cocurrent depressurization-pressure equalization, which tends to shrink the temperature profile of the bed to the more normal range also achieved in the other bed, thereby tuning the VPSA system.

While the invention has been described with reference to the 2-bed system of the drawing, it will be appreciated that it can also be employed to systems having a different number of beds that require tuning during operation to maintain a balanced operation with stable high performance results. It will also be appreciated that the processing sequence employed in each bed can include other processing steps than those indicated above, or variations thereof, without departing from the scope of the invention as recited in the appended claims. While the invention has been described in particular with respect to PSA systems, e.g. VPSA systems, for the separation and recovery of oxygen product from feed air, it will be appreciated by those skilled in the art that it is within the scope of the invention to employ the tuning process herein described for other important PSA gas separation operations. Thus, the invention can be used for air separation operations for the production of nitrogen and for other separations, such as hydrogen/methane, methane/carbon monoxide and the like. In preferred embodiments of the invention, pressure sensors 34 and 35 are used, in conjunction with process computer/controller 36, for purge tuning of the beds, as described below, so that the rate at which purge gas is passed to a bed is such that a constant pressure is maintained during the purge operation, e.g. that a constant vacuum pressure is advantageously maintained during purge of each bed of a VPSA system.

While the PSA processing sequence is normally carried out with separate steps in which the bed pressure is first increased from intermediate pressure to upper adsorption pressure, followed by feed gas introduction to the feed end of the bed at the upper adsorption pressure and withdrawal of a less selectively adsorbable component from the product end of the bed, it is within the scope of the invention to employ a well known variation of this approach. Thus, said steps may be carried out such that feed gas is introduced to the feed end of the bed at a rate such that the pressure thereof is increased from intermediate pressure to the upper adsorption pressure while less selectively adsorbable component is withdrawn from the product end of the bed. This increasing pressure adsorption step can be carried out, with or without subsequent introduction of further quantities of feed gas to the bed with withdrawal of the less selectively adsorbable component at the adsorption pressure level before commencing the cocurrent depressurization/pressure equalization step.

To further illustrate the practice of the invention, the 2-bed VPSA process as depicted by the system illustrated in the drawing is assumed to have the controls adjusted for a 6 hour time delay between adjustments where a new valve position as determined for each of the product end pressure equalization/oxygen product gas repressurization valves. Referring to Table No. 1 below to help illustrate the control logic employed, for a 6:00 AM adjustment time, the difference between the bottom bed temperatures of Bed A and Bed B would be calculated from the 5:00–6:00 AM average hour temperatures, and the Gain Value from the equation above would be multiplied by this difference. The Reset Value of the equation would be calculated by taking the bottom bed temperature difference from the 5:00–6:00 AM hour average, and subtracting from it the bottom bed temperature difference from the 11:00 PM–12:00 AM time period. The Reset Value would multiply this amount and the total Reset Value of the equation would be subtracted from the Gain Value of the equation in order to determine the required valve adjustment amount, as shown in Table No. 1. This valve adjustment amount can be positive or negative and is added to the current valve control setpoints. If Bed A were producing high purity gas, and Bed B were producing lower purity gas, then the temperature at the top of Bed A would be higher and that at the bottom of Bed A would be lower than that of Bed B, and the amount of valve adjustment would be a negative value. This means that the top valve of Bed A during pressure equalization into Bed A would be closed by the adjusted amount, so that the amount of gas leaving Bed B would be reduced, and Bed B would have the tendency to produce higher purity product at a correspondingly lower product flowrate. The adjustment equation is conveniently used to change both top valves of Bed A and Bed B by the same amount, but in opposite directions. Therefore, for the calculated valve adjustment referred to above, when Bed B enters the pressure equalization or repressurization step, its top valve would open more by the valve adjustment amount, thus causing more gas to leave Bed A, and thus to lower the purity of the gas in this bed.

TABLE NO. 1

|  | TIME | | | |
| --- | --- | --- | --- | --- |
|  | 11:00 PM–12:00 AM | 5:00 AM–6:00 AM | 11:00 AM–Noon | 5:00 PM–6:00 PM |
| Bed "A" Temperature | 60° F. | 57° F. | 58° F. | 59° F. |
| Bed "B" Temperature | 60° F. | 62° F. | 61° F. | 60° F. |
| Temperature Difference Bed "A"-Bed "B" | 0 | −5 | −3 | −1 |
| Valve Adjustment Bed "A" | 0 | −1.0 | −.1 | +.1 |
| Valve Adjustment Bed "B" | 0 | +1.0 | +.1 | −.1 |
| Valve Setting Bed "A" | 50°% | 49.0% | 48.9% | 49.0% |
| Valve Setting Bed "B" | 50% | 51% | 51.1% | 51.0% |

Assume:
1) Initial Valve Settings are 50%
2) Gain Value=0.1
3) Reset Value=0.1

Another step in the VPSA (or other PSA) process that affects total flow out of the VPSA vessel is the purge step. It is important that the amount of purge gas during evacuation at the lower desorption pressure is of a proper amount required to remove the desorbed gas. Thus, the amount of purge gas passed into a vessel being evacuated should produce a waste flow equal to the evacuation rate. If the vessel is over purged, then the purge flow will produce a waste flow greater than the evacuation flow rate prior to commencing the purge step, and the pressure in the vessel will begin to rise above the lower desorption pressure. Upon so elevating the pressure, the partial pressure of the impure gas being desorbed and evacuated, i.e. the more adsorbable component of the feed gas, will change, and will cause a small portion of the impurity to readsorb onto the surface of the adsorbent material of the bed, thereby decreasing the effectiveness of the purge step. If the vessel is under purged, then the purge flow will produce a waste flow less than the evacuation rate, and the pressure in the vessel will continue to fall. In this case, the purge step will be somewhat more effective in rinsing impurities from the vessel, but will use more power for waste compression. For this reason, it is important that the purge rate be controlled so that the evacuated bed is at essentially constant lower desorption vacuum pressure during the purge step. A control scheme has been devised, which will control the purge flow rates to this level.

In purge tuning of the VPSA process, the top valve settings are altered for the purge step in order to keep constant a set differential pressure in the evacuated vessel between the start and the end of the purge step. Technically, the purge step is a constant pressure step, where the evacuated vessel is kept at a constant vacuum level during the purge step. However, when the valve opens at the start of the purge step into the evacuated vessel, there is a small top end pressure increase caused by the flow of purge gas into the evacuated vessel, and the adsorbent bed pressure drop caused by the flow. If a correct amount of purge is present in the vessel, this pressure will hold constant for the entire time of the purge step. If the pressure in the vessel continues to rise after the initial top end pressure increase, then the purge rate is too high. The general equation used to control the purge rate to each adsorbent vessel is as follows:

Valve Adjustment Required=Gain
Value×(Desired Pressure Rise−Actual Pressure Rise)

For example, assuming a Gain Value equal to 1.0 and a desired pressure rise of 0.5 psi, if the average actual pressure rise from the beginning to the end of the purge step is 0.25 psi, then the valve adjustment amount will be equal to 0.25%, and the purge valve control setting will increase by this amount in order to increase the purge flow into the evacuated vessel. Purge step valve settings for over purged and under purged examples are shown below in Table No. 2. The frequency of adjustment for the purge valves is not critical and has been found that adjustments made once every 4 processing cycles are fully adequate.

TABLE NO. 2

|  | End of 4 Cycles | End of 4 Cycles | End of 4 Cycles | End of 4 Cycles |
| --- | --- | --- | --- | --- |
| Bed "A" Actual Pressure Rise | 0.5 | .45 (under purged) | .38 (under purged) | .48 (under purged) |
| Bed "B" Actual Pressure Rise | 0.5 | .63 (over purged) | .57 (over purged) | .52 (over purged) |
| Valve Adjustment Bed "B" | 0 | +0.05% | +.12% | +0.02% |
| Valve Adjustment Bed "B" | 0 | −.13% | −.07% | −0.02% |
| Valve Setting Bed "A" | 25% | 25.05 | 25.17% | 25.19% |
| Valve Setting Bed "B" | 25% | 24.87% | 24.8% | 24.78% |
| Actual Pressure Rise |  |  |  |  |

Assume:
1) Initial Valve Settings are 25%
2) Gain value=1.0
3) Desired Pressure Rise=0.5 psi It will be appreciated from the disclosure above that the tuning of VPSA systems, and other PSA systems, in accordance with the invention provides a significant improvement over past practices involving the connection of a purity analyzer to the common product line of the adsorbent beds, e.g. of the 2 beds in a two-bed system. While past practices accomplished adjustments to the pressure equalization or repressurization valve control setpoints to balance breakthrough purities, the process of the invention enables desired adjustments to be made to solve potential process problems before they occur so as to minimize any undesired effects on desired product flow and/or purity values. The VPSA tuning process of the invention is thus able to conveniently adjust the processing cycle so as to advantageously maintain the desired stable, high performance characteristics of the VPSA or other PSA system.

We claim:

1. In a process for the tuning of a pressure swing adsorption system for the separation and recovery of a component of a feed gas stream, said system containing at least two adsorbent beds capable of selectively adsorbing one component of the feed gas stream from another, wherein each bed undergoes, on a cyclic basis, a processing sequence including: (1) repressurization from an intermediate pressure to an upper adsorption pressure; (2) feed gas introduction to the feed end of the bed at the upper adsorption pressure with withdrawal of a less selectively adsorbable component from the product end of the bed; (3) cocurrent depressurization or pressure equalization with release of gas from the product end of the bed and its passage to the product end of another bed in the system initially at a lower pressure for pressure equalization at an intermediate pressure; (4) countercurrent depressurization to a lower desorption pressure, with release of gas from the feed end of the bed; and (5) partial repressurization or pressure equalization to said intermediate pressure, with passage of gas to the product end of the bed, said gas having been released from another bed in the system initially at a higher pressure for pressure equalization at said intermediate pressure, the improvement comprising:

(a) monitoring bed temperature at the same portion of each adsorbent bed so as to track a temperature profile in each bed; and (b) adjusting the amount of gas coming from each adsorbent bed in response to an imbalance in the system as determined by variations in the temperature profiles in the beds, with (1) the amount of net gas release from the product end of a bed having a temperature range therein exceeding a normal temperature profile of said bed under normal balanced operating conditions of the system, and being produced as reflux gas for another bed, being increased so as to lower said temperature profile therein to a normal balanced condition, and (2) the amount of net gas released from the product end of a bed having a temperature range therein that is less than the normal temperature profile of said bed under normal balanced operating conditions of the system, and being produced as reflux gas for another bed, being decreased so as to increase the temperature profile therein to its normal balanced condition, whereby the system, rendered imbalanced due to a processing disturbance, is advantageously restored to a balanced operating condition for the maintenance of stable high performance of the system.

2. The process of claim 1 and including evacuating the bed to a lower subatmospheric desorption pressure following initial countercurrent depressurization to a lower desorption pressure in element 4 of said processing sequence.

3. The process of claim 2 in which the feed gas is air, and said less selectively adsorbable component comprises oxygen product.

4. The process of claim 3 in which said system comprises two adsorbent beds.

5. The process of claim 1 in which the feed gas is air.

6. The process of claim 1 in which said system comprises two adsorbent beds.

7. The process of claim 1 in which the bed temperature is monitored in the lower portion of each bed.

8. The process of claim 7 in which the bed temperature is monitored in the lower, intermediate and upper portion of each bed.

9. The process of claim 7 and including sending temperature monitoring input signals to a process computer/controller, and sending output signals therefrom to control means to adjust the flow rates to each bed in response to an imbalance in the system.

10. The process of claim 1 and including purging of the bed to facilitate desorption of the more selectively adsorbed component for removal from the feed end of the bed at the lower desorption pressure.

11. The process of claim 10 in which said lower desorption pressure is a lower subatmospheric desorption pressure.

12. The process of claim 11 in which said feed gas is air, and said less selectively adsorbable component comprises oxygen product.

13. The process of claim 12 in which said system comprises two adsorbent beds.

14. The process of claim 10 and including adjusting the flow of purge gas to the bed so as to maintain constant purge pressure conditions.

15. The process of claim 14 and including sending input pressure conditions to a process computer/controller and output signals therefrom to control means to adjust the flow of purge gas to the bed.

16. The process of claim 15 and including evacuating the bed to a lower subatmospheric pressure following initial countercurrent depressurization to a lower desorption pressure in element (4) of said processing sequence.

17. The process of claim 16 in which the feed gas is air, and said less selectively adsorbable component comprises oxygen product.

18. The process of claim 17 in which said system comprises two adsorbent beds containing adsorbent material capable of selectively adsorbing nitrogen from air.

19. The process of claim 1 in which elements (1) and (2) of said processing sequence comprise introducing feed gas to the feed end of the bed at a rate such that the pressure thereof is increased from said intermediate pressure to the upper adsorption pressure while said less selectively adsorbable component is withdrawn from the product end of the bed.

20. The process of claim 19 and including evacuating the bed to a lower subatmospheric desorption pressure.

* * * * *